(12) United States Patent
Harkrider et al.

(10) Patent No.: US 7,058,277 B1
(45) Date of Patent: Jun. 6, 2006

(54) TARGET ILLUMINATING BEAM STEERING DEVICE

(75) Inventors: Curtis J. Harkrider, Wheaton, IL (US); Ronald B. Jones, Mundelein, IL (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 11/080,224

(22) Filed: Mar. 15, 2005

(51) Int. Cl.
*G02B 6/00* (2006.01)

(52) U.S. Cl. .......................... 385/147; 385/32; 385/33; 351/221

(58) Field of Classification Search ............ 385/32–39, 385/147; 351/221, 205
See application file for complete search history.

(56) References Cited

U.S. PATENT DOCUMENTS

| | | | |
|---|---|---|---|
| 5,633,695 A | * | 5/1997 | Feke et al. .................. 351/221 |
| 5,861,845 A | | 1/1999 | Lee et al. |
| 6,348,890 B1 | | 2/2002 | Stephens |
| 6,535,165 B1 | | 3/2003 | Stephens |
| 6,751,009 B1 | | 6/2004 | Khoshnevisan et al. |
| 2003/0107793 A1 | | 6/2003 | Capps |
| 2004/0151504 A1 | | 8/2004 | Triebes et al. |

* cited by examiner

*Primary Examiner*—Phan Palmer
(74) *Attorney, Agent, or Firm*—Stetina Brunda Garred & Brucker

(57) ABSTRACT

A target illuminating system is provided for steering a scan optical beam and reducing the size of an optical output aperture. The system includes an array of scan beam outlets being selectively operative to receive and project a point source of scan beam radiation along an optical path. The system also includes a collimating element being disposed along the optical path. The collimating element is operative to receive the point source of scan beam radiation and to output the collimated scan optical beam in a desired coarse direction corresponding to a selected one of the scan beam outlets. The scan optical beam defines a scan exit pupil which is substantially coincident with the optical output aperture.

33 Claims, 9 Drawing Sheets

TARGET ILLUMINATING BEAM STEERING DEVICE

CROSS-REFERENCE TO RELATED APPLICATIONS

Not Applicable

STATEMENT RE: FEDERALLY SPONSORED RESEARCH/DEVELOPMENT

Not Applicable

BACKGROUND OF THE INVENTION

The present invention pertains generally to optical beam steering devices and more particularly to an optical beam steering device uniquely configured for reducing the size of an optical output aperture, especially as utilized on an airborne platform.

The use of optical beams as a medium of communication is a well known technological advance. In fact, several applications deflect and steer optical beams to enhance the accuracy and utility of a given application. Non-military examples may include the use of steered optical beams in applications such as scanners, laser printers, telecommunications, and medical devices. In military applications, optical beams may be steered and directed in order to perform countermeasures, multi-target designation and guidance, range finding, and general surveillance. Nevertheless, there are limitations associated with the use of optical beams on airborne platforms.

In particular, a current usage of optical beams on airborne platforms utilizes a gimballed turret configuration. Typically, this configuration is located on the underbelly of an aircraft and the beams are emitted therefrom toward targets below. Depending on other uses, the gimballed turret configuration may be located on other areas of the aircraft. Although this configuration may provide a wide field of view for the optical beam, it may also decrease the aerodynamic efficiency of the aircraft. Additionally, such a mechanical system may have numerous other drawbacks which may include the speed, radar cross section, and complexity of the system.

Therefore, there is a need in the art for an optical beam steering device that reduces the aerodynamic drag on an airborne platform. Additionally, there is a need in the art for an optical beam steering device that tends to improve the speed and radar cross section while reducing the complexity of current methods of steering optical beams from airborne platforms.

BRIEF SUMMARY OF THE INVENTION

A target illuminating system is provided for steering a scan optical beam and reducing the size of an optical output aperture. The system may comprise an array of scan beam outlets being selectively operative to receive and project a point source of scan beam radiation along an optical path; and a collimating element being disposed along the optical path, the collimating element being operative to receive the point source of scan beam radiation and to output the collimated scan optical beam in a desired coarse direction corresponding to a selected one of the scan beam outlets, the scan optical beam defining a scan exit pupil, wherein the scan exit pupil is substantially coincident with the optical output aperture.

In accordance with an aspect of the present invention, the collimating element may be at least one mirror. The collimating element may also be at least one lens.

In an embodiment of the present invention, the collimating element may define a focal point along the optical path, the collimating element outputting the scan optical beam with the exit pupil being substantially coincident with the focal point of the collimating element. In this regard, the collimating element may be at least one lens.

In another embodiment of the present invention, the target illuminating system may further include a fine steering element being disposed along the optical path intermediate the collimating element and the focal point and being operative to receive and redirect the scan optical beam through a desired fine angular deviation.

According to another aspect of the present invention, the target illuminating system may further include a scan optical switch including a plurality of scan optical ports and being operative to receive the scan beam radiation and selectively direct the scan beam radiation to at least one of the scan optical ports in response to the desired coarse direction; and a plurality of scan optical channels each including a scan beam inlet and the scan beam outlet and being operative to transmit the scan beam radiation, the scan beam inlets each being in optical communication with the respective ones of the scan optical ports and being operative to receive and transmit the scan optical beam to the respective ones of the scan beam outlets. In this regard, each of the scan optical channels may be optic fibers. Additionally, the scan optical beam may have a first wavelength.

In another embodiment of the present invention, each of the scan beam outlets may be coplanar and telecentric. Each of the scan beam outlets may also be coplanar and non-telecentric. In this regard, each of the scan beam outlets may point inwardly toward the collimating element. In another aspect of the present invention, the target illuminating system may further include a fiber base dish whereon each of the scan beam outlets is mounted. In yet another aspect of the present invention, the target illuminating system may include a fiber base dish defining a concave dish surface whereto each of the scan beam outlets is oriented relatively orthogonally and points inwardly toward the collimating element.

In accordance with another aspect of the present invention, a target illuminating system is provided for steering a combined optical beam and reducing the size of an optical output aperture. The system may comprise an array of scan beam outlets and trail beam outlets being selectively operative to receive and project the respective ones of a point source of scan beam radiation and a point source of trail beam radiation along an optical path; and a collimating element being disposed along the optical path, the collimating element being operative to receive the point sources of scan and trail beam radiation and to output the collimated combined optical beam in a desired coarse direction corresponding to a selected ones of the scan and trail beam outlets, the combined optical beam defining a combined exit pupil, wherein the combined exit pupil is substantially coincident with the optical output aperture. In accordance with an aspect of the present invention, the collimating element may be at least one mirror. The collimating element may also be at least one lens. In this regard, the lens may utilize a transverse chromatic aberration to combine the scan optical beam and the trail optical beam. The lens may also utilize a longitudinal chromatic aberration to combine the scan optical beam and the trail optical beam.

According to another aspect of the present invention, the collimating element may define a focal point along the optical path, the collimating element outputting the collimated combined optical beam with the combined exit pupil being substantially coincident with the focal point of the collimating element. In this regard, the collimating element may be at least one lens.

In another embodiment of the present invention, the target illuminating system may further include a fine steering element being disposed along the optical path intermediate the collimating element and the focal point and being operative to receive and redirect the combined optical beam through a desired fine angular deviation.

In accordance with another aspect of the present invention, the target illuminating system may further include a scan beam optical switch including a plurality of scan beam optical ports and being operative to receive the scan beam radiation and selectively direct the scan beam radiation to at least one of the scan beam optical ports in response to the desired coarse direction; a plurality of scan beam optical channels each including a scan beam inlet and the scan beam outlet and being operative to transmit the scan beam radiation, the scan beam inlets each being in optical communication with the respective ones of the scan optical ports and being operative to receive and transmit the scan optical beam to the respective ones of the scan beam outlets; a trail beam optical switch including a plurality of trail beam optical ports and being operative to receive the trail beam radiation and selectively direct the trail beam radiation to at least one of the trail beam optical ports in response to the desired coarse direction; and a plurality of trail beam optical channels each including a trail beam inlet and the trail beam outlet and being operative to transmit the trail beam radiation, the trail beam inlets each being in optical communication with the respective ones of the trail beam optical ports and being operative to receive and transmit the trail beam optical beam to the respective ones of the trail beam outlets. In this regard, each of the scan beam optical channels and the trail beam optical channels may be optic fibers.

In accordance with an aspect of the present invention, the scan beam radiation may have a first wavelength and the trail beam radiation may have a second wavelength.

According to another aspect of the present invention, each of the scan beam outlets and the trail beam outlets may be coplanar and telecentric. Each of the scan beam outlets and the trail beam outlets may also be coplanar and nontelecentric. In this regard, each of the scan beam outlets and the trail beam outlets may point inwardly toward the collimating element. Additionally, the target illuminating system may further include a fiber base dish whereon each of the scan beam outlets and the trail beam outlets is mounted. In yet another aspect of the present invention, the target illuminating system may also include a fiber base dish defining a concave dish surface whereto each of the scan beam outlets and the trail beam outlets is oriented relatively orthogonally and points inwardly toward the collimating element.

BRIEF DESCRIPTION OF THE DRAWINGS

An illustrative and presently preferred embodiment of the invention is shown in the accompanying drawings in which.

DETAILED DESCRIPTION OF THE INVENTION

Figure 1:
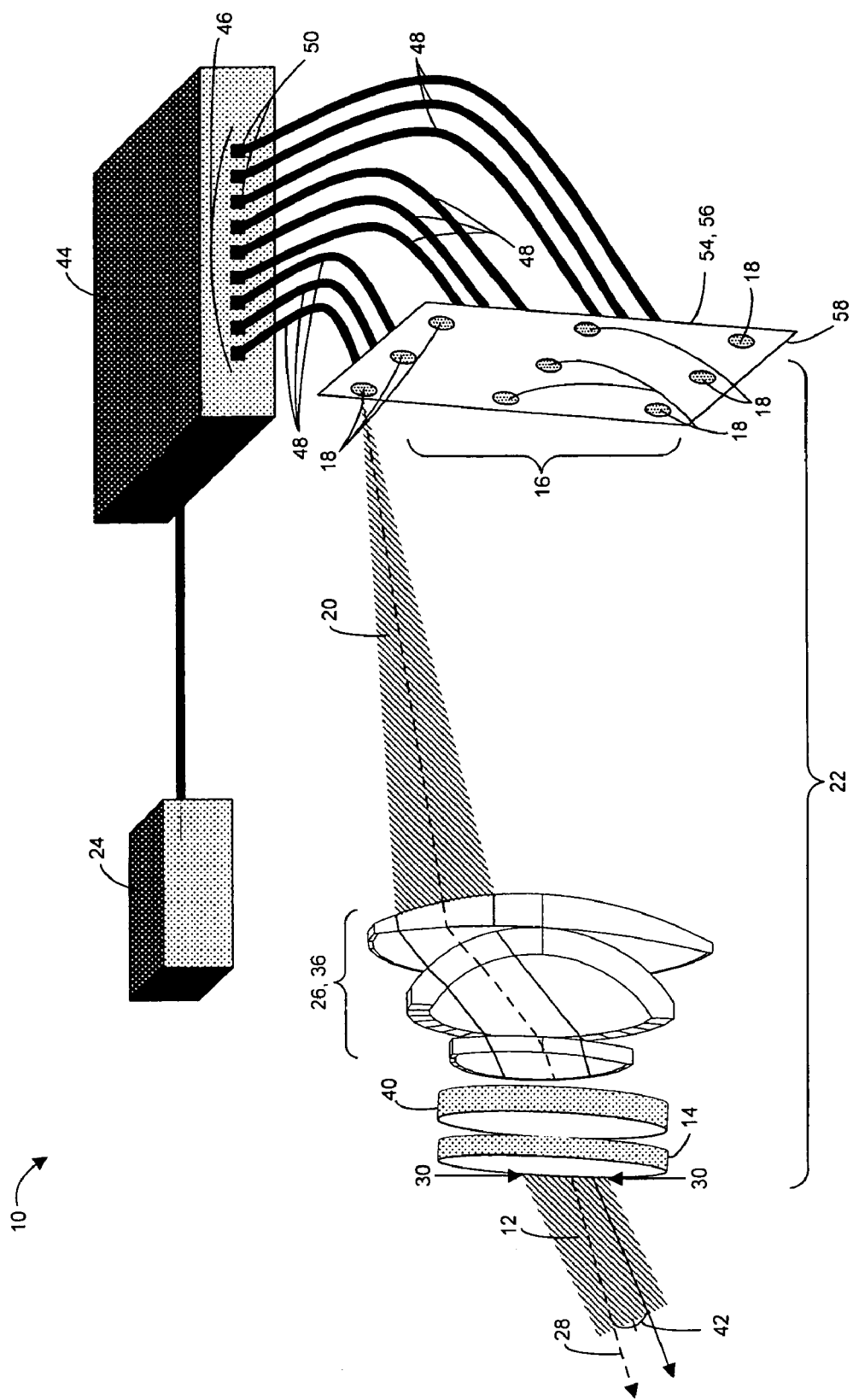
FIG. 1 is a perspective view of a target illuminating system for steering a scan optical beam and reducing the size of an optical output aperture utilizing an array of scan beam outlets, a collimating element and a fine steering element.

Referring now to the drawings wherein the showings are for purposes of illustrating the preferred embodiment of the present invention only and not for purposes of limiting the same, FIG. 1 is a perspective view of a target illuminating system 10 for steering a scan optical beam 12 and reducing the size of an optical output aperture 14.

It is contemplated that an embodiment of the present invention may be utilized to steer the scan optical beam 12 in both elevation and azimuth. Further, an embodiment of the present invention may be used for steering a laser beam from an airborne platform as an aspect of a military application. In this regard, such an application may be a laser guided bomb or a directed energy application. The optical output aperture 14 is preferably manufactured from man-made sapphire, which may exhibit exceptional qualities when used as a conformal window on an aircraft. The advantages of man-made sapphire may include its high scratch resistance, durability, and its transmissive properties. It is contemplated that materials exhibiting similar desirable properties may be substituted and exhibit similar positive results. As man-made sapphire is an expensive material, an embodiment of the present invention may reduce size of the optical output aperture 14 using the man-made sapphire and thereby reduce the cost of the target illuminating system 10.

Referring to FIG. 1, according to an embodiment of the present invention, the target illuminating system 10 may include an array 16 of scan beam outlets 18. The scan beam outlets 18 may be selectively operative to receive and project a point source of scan beam radiation 20 along an optical path 22. The scan beam outlet 18 may be a transmitting end of an optical fiber. Additionally, the point source of scan beam radiation 20 may refer to the scan beam radiation emitted from the scan beam outlet 18. Additionally, the scan beam radiation may be electromagnetic radiation which may include radio, microwave, infra red, visible light, ultra violet, x-ray, and gamma ray radiation. The optical path 22 may be defined as the desired course along which the scan beam radiation and the scan optical beam 12 travel, from a first radiation source 24 to the scan beam outlet 18 and from the scan beam outlet 18 through intermediate points until the scan optical beam 12 reaches a target.

The target illuminating system 10 may further include a collimating element 26. The collimating element 26 may be disposed along the optical path 22, as shown in FIG. 1. The collimating element 26 may also be operative to receive the point source of scan beam radiation 20 and to output the collimated scan optical beam 12 in a desired coarse direction 28 corresponding to a selected one of the scan beam outlets 18. The scan optical beam 12 may define a scan exit pupil 30, and the scan exit pupil 30 may be substantially coincident with the optical output aperture 14, as shown in FIGS. 1–7. Thus it is contemplated that the scan beam radiation may be projected from any of the scan beam outlets 18, received and collimated as the scan optical beam 12 by the collimating element 26, and pass through the optical output aperture 14 with the scan exit pupil 30 being substantially coincident therewith. As shown in FIG. 7, each scan optical beam 12 emitted from the target illuminating system 10 at various coarse directions 28 may pass through a common scan exit pupil 30 which is substantially coincident with the optical output aperture 14. For example, referring again to FIG. 7, if two or more scan beam outlets 18 emit the scan beam radiation simultaneously, the scan exit pupils 30 of the resulting plurality of scan optical beams 12 will each generally be coincident in the common scan exit pupil 30.

Figure 3:
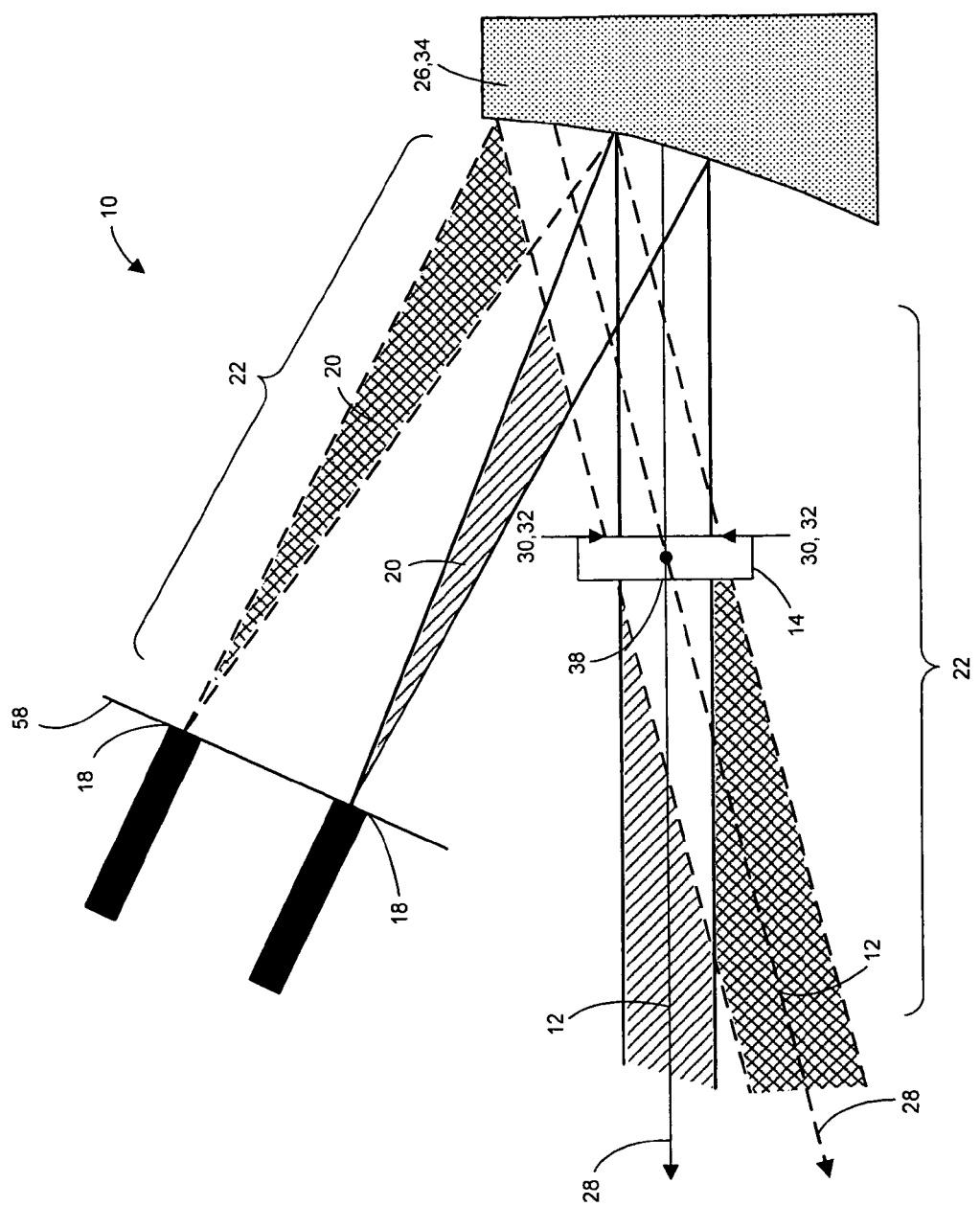
FIG. 3 is a side view of the target illuminating system wherein the collimating element is a mirror.
Figure 4:
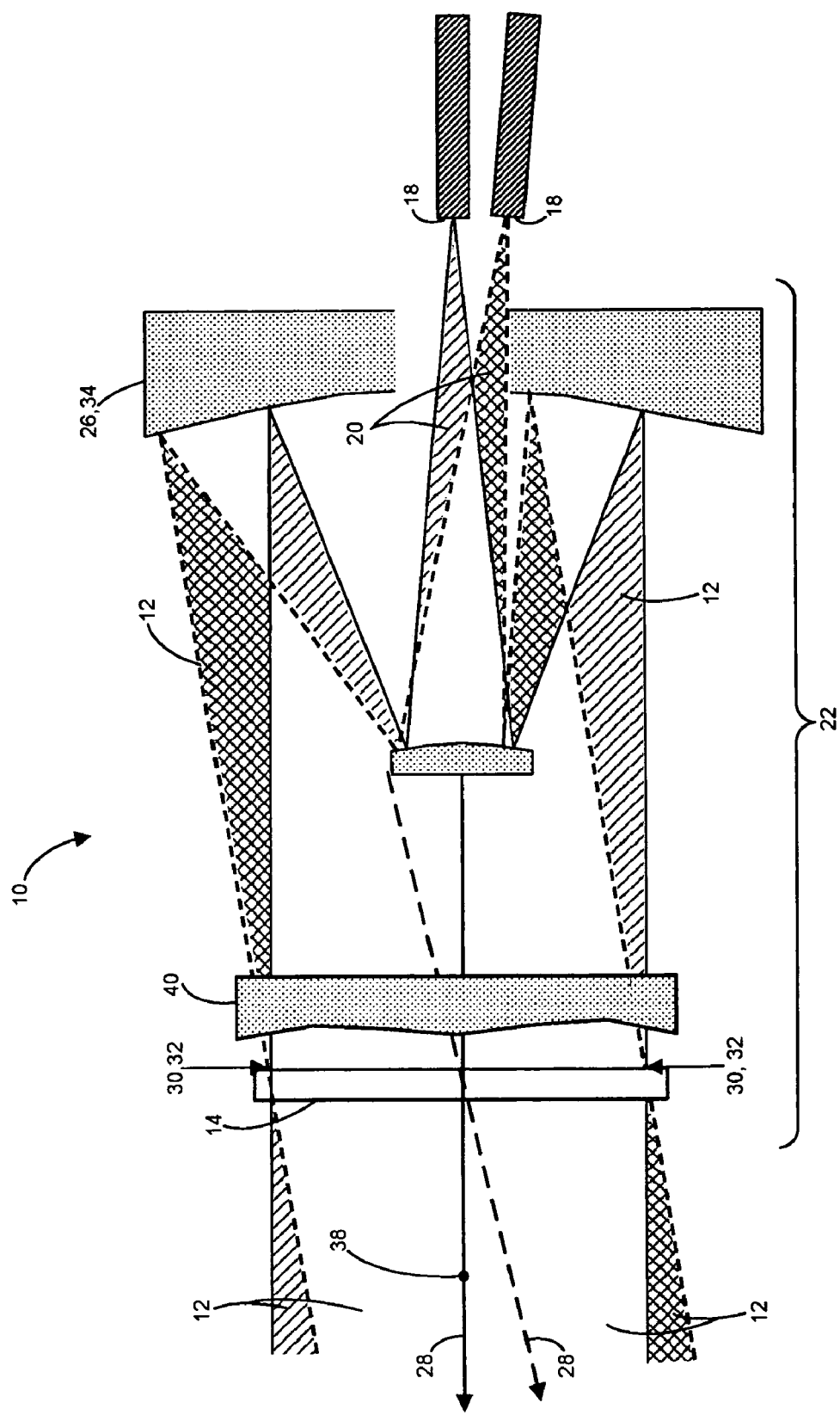
FIG. 4 is a side view of the target illuminating system wherein the collimating element includes two mirrors.

As shown in FIG. 3, the collimating element 26 may be at least one mirror. However, as shown in FIG. 4, the collimating element 26 may include two mirrors. In this embodiment of the present invention, the scan optical beam 12 outputted by the mirror 34 may have the scan exit pupil 30 being substantially coincident with the optical output aperture 14.

Figure 5:
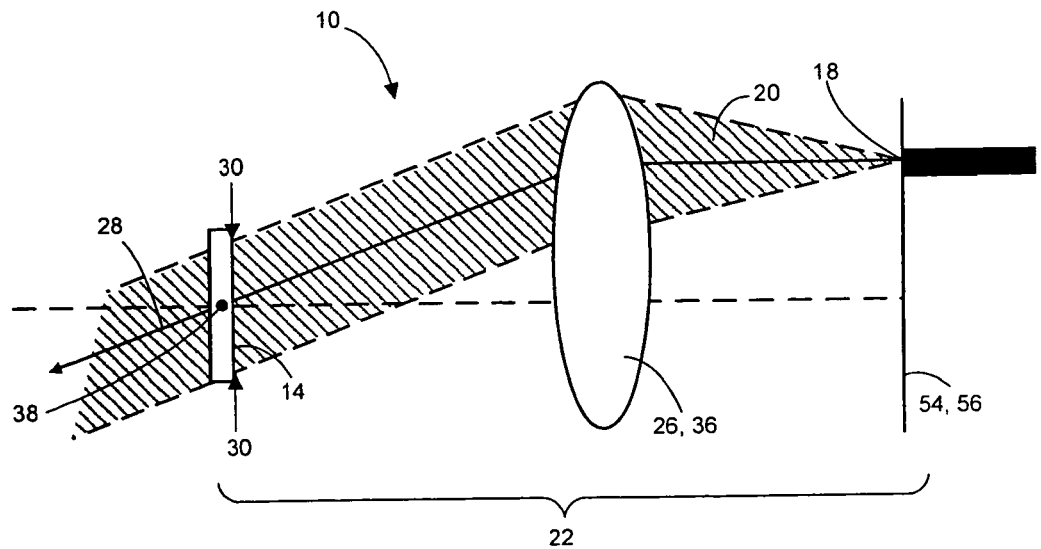
FIG. 5 is a side view of the target illuminating system wherein the scan beam outlet is telecentric.
Figure 6:
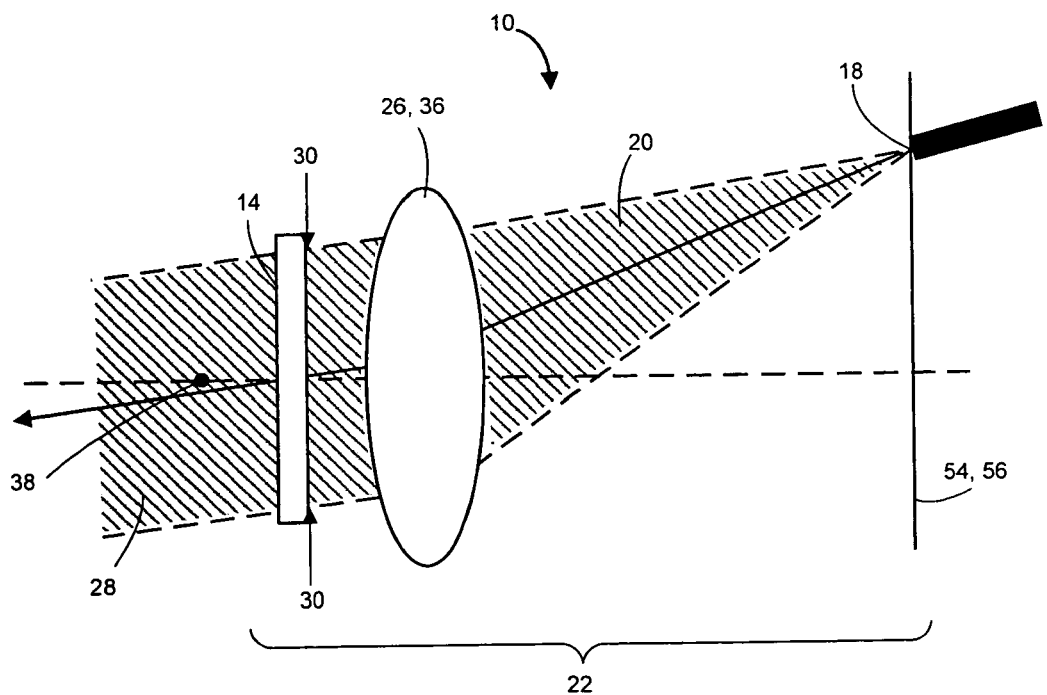
FIG. 6 is a side view of the target illuminating system wherein the scan beam outlet is nontelecentric.
Figure 7:
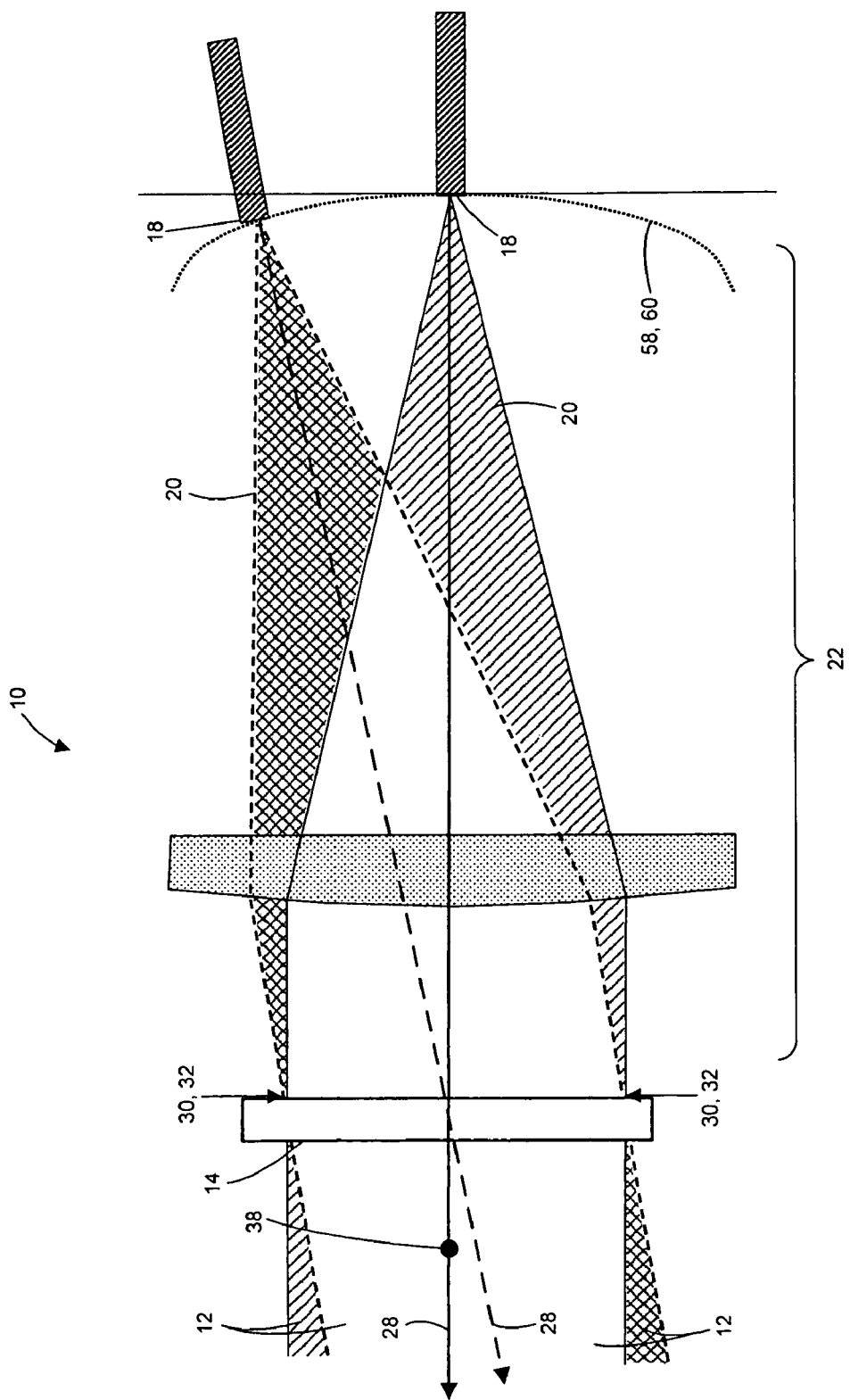
FIG. 7 is a side view of the target illuminating system wherein the scan beam outlets are oriented orthogonally relative to a concave dish surface.

Additionally, the collimating element 26 may be at least one lens 36, as shown in FIGS. 5–7. According to another embodiment of the present invention, as shown in FIG. 1, the collimating element 26 may be multiple lenses. Thus the lens 36 may be configured with the scan exit pupil 30 being substantially coincident with the optical output aperture 14 for each scan optical beam 12 emitted from the target illuminating system 10.

The target illuminating system 10 may steer the scan optical beam 12 in the desired coarse direction 28 corresponding to a selected one of the scan beam outlets 18, as shown in FIGS. 1–7. In this regard, it is contemplated that the scan beam outlets 18 may be configured in the array 16 as shown in FIG. 1. As a given one of the scan beam outlets 18 projects the point source of scan beam radiation 20 to the collimating element 26, the collimating element 26 may output the collimated scan optical beam 12 in a given coarse direction 28. Similarly, when another given one of the scan beam outlets 18 projects the point source of scan beam radiation 20 to the collimating element 26, the collimating element 26 may output the collimated scan optical beam 12 in another given coarse direction 28, as shown in FIG. 7.

It is contemplated that the array 16 of the scan beam outlets 18 may be configured to utilize a maximum number of the scan beam outlets 18. The maximum number of the scan beam outlets 18 may be indicated by the proximity of the scan beam outlets 18 to each other within the array 16. It is contemplated that the maximum number of the scan beam outlets 18 may be a configuration wherein the scan beam outlets 18 are positioned adjacent relative to one another with little or no space therebetween. However, it is also contemplated that the array 16 of the scan beam outlets 18 may be configured to utilize a minimal number of scan beam outlets 18. In such a configuration, it is contemplated that the scan beam outlets 18 may be spaced distally relative to one another in the array 16. It is contemplated that the configuration of the array 16 of the scan beam outlets 18 may be manipulated to alter the range of the desired coarse direction 28 through which the collimating element 26 may output the scan optical beam 12.

In another embodiment of the present invention, it is contemplated that the collimating element 26 may define a focal point 38 along the optical path 22, as shown in FIGS. 3–7. The collimating element 26 may thereby output the scan optical beam 12 with the exit pupil being substantially coincident with the optical output aperture 14. In one implementation of the present invention, the collimating element 26 may output the scan optical beam 12 with the exit pupil being substantially coincident with the focal point 38 of the collimating element 26, as shown in FIGS. 3 and 5. In another implementation, the output aperture 14 may be interposed between the focal point 38 of the collimating element 26 and the collimating element 26, as shown in FIGS. 4, 6–7. In this regard, the collimating element 26 may be at least one lens 36. Therefore, it is contemplated that multiple lenses may be used, as shown in FIG. 1. The collimating element 26 may be configured to include a doublet, triplet or quadruplet lens. Furthermore, it is contemplated that other numbers and shapes of lenses may be used. The lenses may be concave, convex, or any configuration of concave and convex used together or separately.

Referring again to FIG. 1, in another embodiment of the present invention, the target illuminating system 10 may further include a fine steering element 40. The fine steering element 40 may be disposed along the optical path 22 and may be operative to receive and redirect the scan optical beam 12 through a desired fine angular deviation 42, as shown in FIG. 1. In this regard, it is contemplated that the fine steering element 40 follows the collimating element 26 along the optical path 22.

In another embodiment of the present invention, the fine steering element 40 may be disposed along the optical path 22 intermediate the collimating element 26 and the focal point 38 and may be operative to receive and redirect the scan optical beam 12 through the desired fine angular deviation 42. In this regard, it is contemplated that the fine steering element 40 follows the collimating element 26 along the optical path 22. The fine steering element 40 may be one element, or it may refer to multiple fine steering elements that are utilized to receive and redirect the scan optical beam 12 through the desired fine angular deviation 42.

The fine steering element 40 may be one of several types of fine steering elements, such as a fast steering mirror, Risley prism pair, liquid crystal phased array, electro optic phased array, MEMS mirror array, or a deformable mirror. It is contemplated that the fine steering element 40 may be any one of the aforementioned types of fine steering elements. However, it is also contemplated that any of the aforementioned fine steering elements may be used in combination in order to receive and redirect the scan optical beam 12 through the desired fine angular deviation 42.

According to another aspect of the present invention, it is contemplated that the desired coarse direction 28 of the scan optical beam 12 may be adjusted in accordance to the desired fine angular deviation 42 in order to provide beam steering over smaller steering angles. Thus, according to an aspect of the present invention, the target illuminating system 10 may integrate the capabilities of steering the scan optical beam 12 through the coarse angle and the fine angular deviation 42.

As shown in FIG. 1, according to another aspect of the present invention, the target illuminating system 10 may include a scan optical switch 44 including a plurality of scan optical ports 46. The scan optical switch 44 may be operative to receive the scan beam radiation from the first radiation source 24 and selectively direct the scan beam radiation to at least one of the scan optical ports 46 in response to the desired coarse direction 28. Furthermore, the target illuminating system 10 may include a plurality of scan optical channels 48. Each scan optical channel 48 may include a scan beam inlet 50 and the scan beam outlet 18 and may be operative to transmit the scan beam radiation. In this regard, the scan beam inlets 50 may each be in optical communication with the respective ones of the scan optical ports 46 of the scan optical switch 44. The scan beam inlets 50 may be operative to receive and transmit the scan beam radiation to the respective ones of the scan beam outlets 18.

It is contemplated that the scan beam optical channels may be optical fibers. In this regard, the scan beam optical fibers may be single mode or multi mode optical fibers. It is contemplated therefore that with the use of single mode optical fibers, the target illuminating system 10 may operate with the scan beam radiation being hundreds of nanometers in bandwidth. Additionally, it is contemplated that the target illuminating system 10 may operate with the scan beam radiation being thousands of nanometers in bandwidth when multi mode optical fibers are utilized.

In accordance with another aspect of the present invention, it is contemplated that the scan optical beam 12 may have a first wavelength. The first wavelength may be determined according to the needs and specifications of the target illuminating system 10.

In accordance with yet another aspect of the present invention, each of the scan beam outlets 18 may be coplanar and telecentric, as illustrated in FIG. 5. In this regard, the scan beam outlets 18 may be configured in a 2D coplanar array 54, as illustrated in FIG. 1. The telecentricity of the scan beam outlets 18 may refer to their orthogonal orientation within the 2D coplanar array 54 relative to a common plane 56. In accordance with yet another aspect of the present invention, each of the scan beam outlets 18 may be coplanar and nontelecentric, as illustrated in FIG. 6. Therefore, the scan beam outlets 18 may be oriented in the 2D coplanar array 54; however the scan beam outlets 18 may not be oriented orthogonally relative to the common plane 56. In this regard, it is contemplated that the scan beam outlets 18 may each point inwardly toward the collimating element 26, as shown in FIG. 6. It is contemplated that such a configuration may allow for compaction of the dimensions of the target illuminating system 10. Such compaction and miniaturization of the target illuminating system 10 may be desirable according to the requirements of certain application.

In accordance with another aspect of the present invention, the target illuminating system 10 may include a fiber base dish 58 whereon each of the scan beam outlets 18 may be mounted, as shown in FIG. 1. Referring to FIG. 7, in accordance with another aspect of the present invention, the fiber base dish 58 may define a concave dish surface 60 whereto each of the scan beam outlets 18 points inwardly toward the collimating element 26. The inwardly pointing orientation may be accomplished by orienting each of the scan beam outlets 18 relatively perpendicular with respect to the concave dish surface 60; however, such perpendicular orientation is not required. Thus, the fiber base dish 58 may define the concave dish surface 60 and the scan beam outlets 18 need not be oriented orthogonally relative to the concave dish surface 60. Such an inwardly pointing orientation may provide for a configuration of the scan beam outlets 18 that is not coplanar nor telecentric. Thus, the scan beam outlets 18 may be mounted on the fiber base dish 58 and may each point inwardly toward the collimating element 26.

Figure 2:
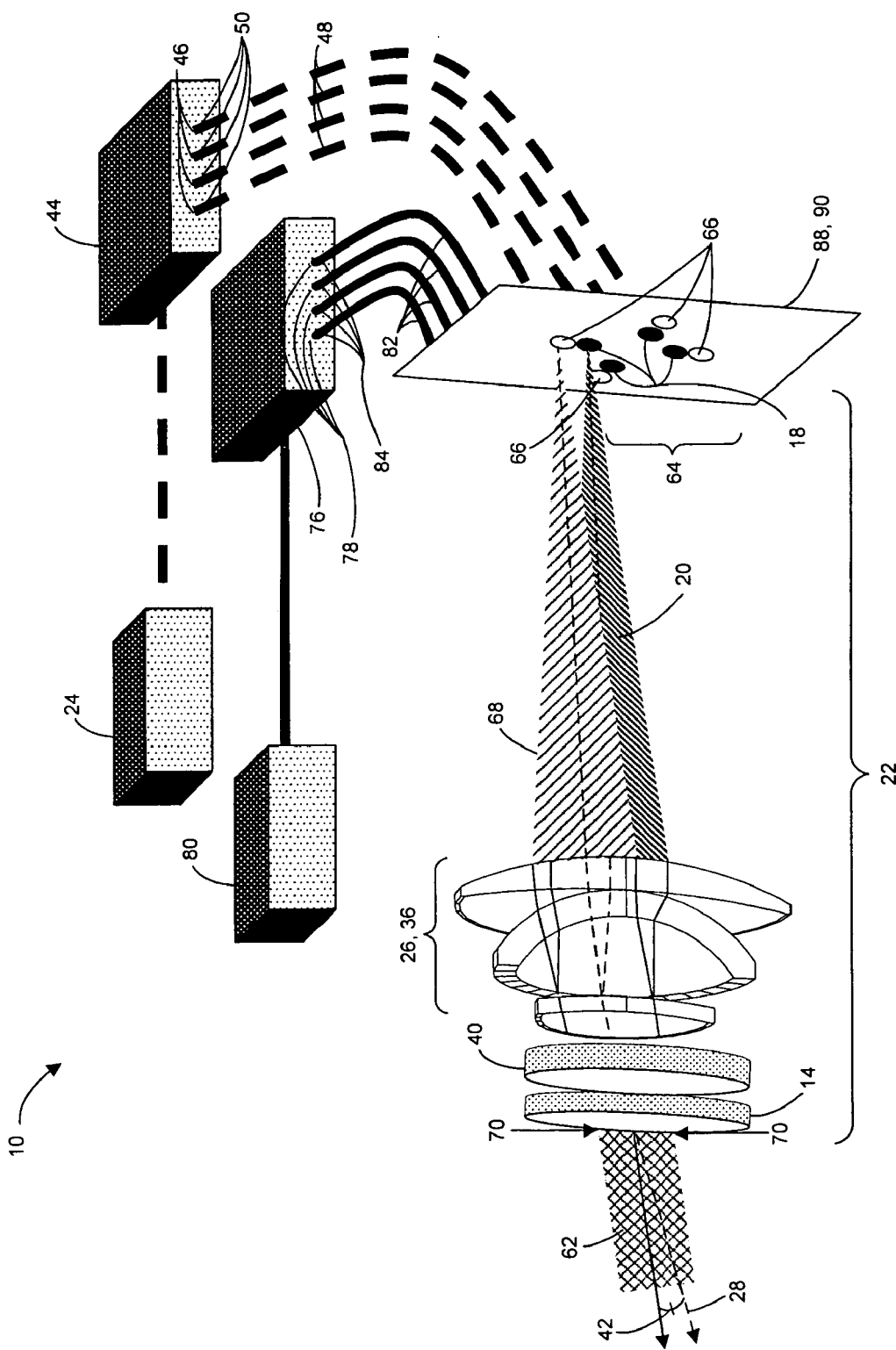
FIG. 2 is a perspective view of the target illuminating system for steering a combined optical beam and reducing the size of the optical output aperture utilizing a combined array of the scan beam outlets and trail beam outlets.

Referring now to FIG. 2, in another aspect of the present invention, a target illuminating system 10 for steering a combined optical beam 62 and reducing the size of an optical output aperture 14 is provided. The system 10 may include a combined array 64 of scan beam outlets 18 and trail beam outlets 66 being selectively operative to receive and project the respective ones of a point source of scan beam radiation 20 and a point source of trail beam radiation 68 along an optical path 22; and a collimating element 26 being disposed along the optical path 22, the collimating element 26 being operative to receive the point sources of scan and trail beam radiation and to output the collimated combined optical beam 62 in a desired coarse direction 28 corresponding to selected ones of the scan and trail beam outlets 66; the combined optical beam 62 defining a combined exit pupil 70, wherein the combined exit pupil 70 is substantially coincident with the optical output aperture 14.

The scan beam outlets 18 and the trail beam outlets 66 may be a transmitting end of an optical fiber. Additionally, the point source of scan beam radiation 20 and the point source of trail beam radiation 68 may refer to the respective ones of the scan beam radiation emitted from the scan beam outlet 18 and the trail beam radiation emitted from the trail beam outlet 66. Additionally, the scan beam radiation and the trail beam radiation may each be electromagnetic radiation which may include radio, microwave, infra red, visible light, ultra violet, x-ray, and gamma ray radiation. In this regard, the trail beam radiation and the scan beam radiation may be different forms of electromagnetic energy. The optical path 22 may be defined as the desired course along which the scan and trail beam radiations travel, from the respective ones of the first radiation source 24 and a second radiation source 80 to the respective ones of the scan beam outlet 18 and the trail beam outlet 66 and from respective ones of the scan beam outlet 18 and the trail beam outlet 66 through intermediate points until the combined optical beam 62 reaches a target.

Figure 8:
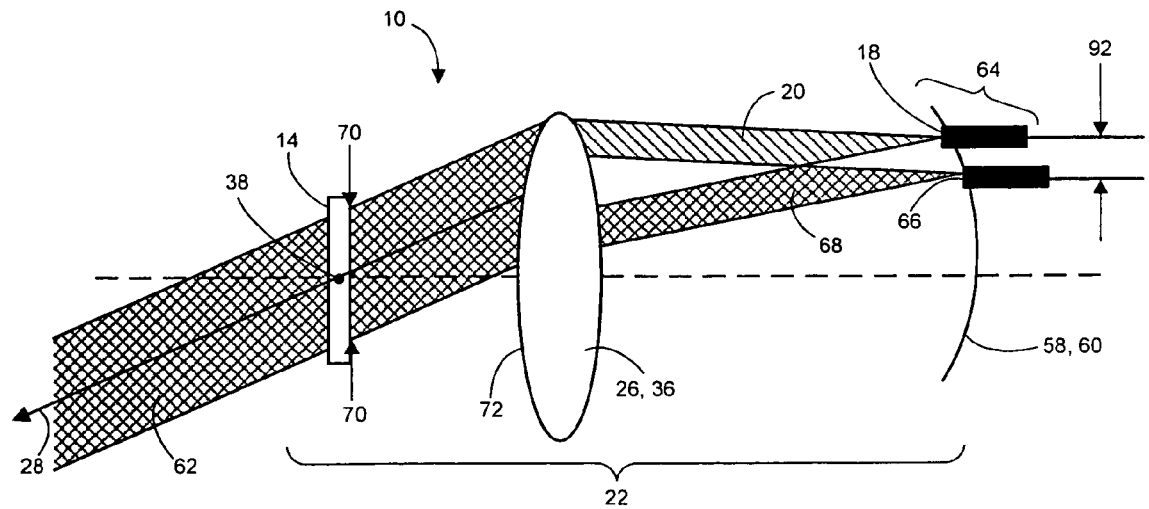
FIG. 8 is a side view of the target illuminating system wherein the collimating element is a lens utilizing a transverse chromatic aberration and the scan beam outlet and the trail beam outlet are configured to compensate for the transverse chromatic aberration.
Figure 9:
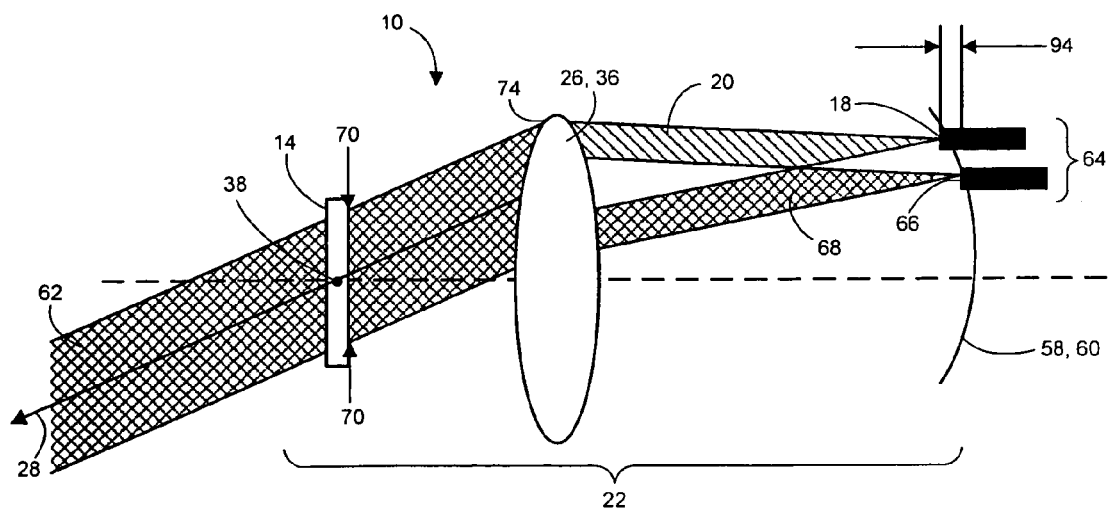
FIG. 9 is a side view of the target illuminating system wherein the collimating element is a lens utilizing a longitudinal chromatic aberration and the scan beam outlet and the trail beam outlet are configured to compensate for the longitudinal chromatic aberration.
Figure 10:
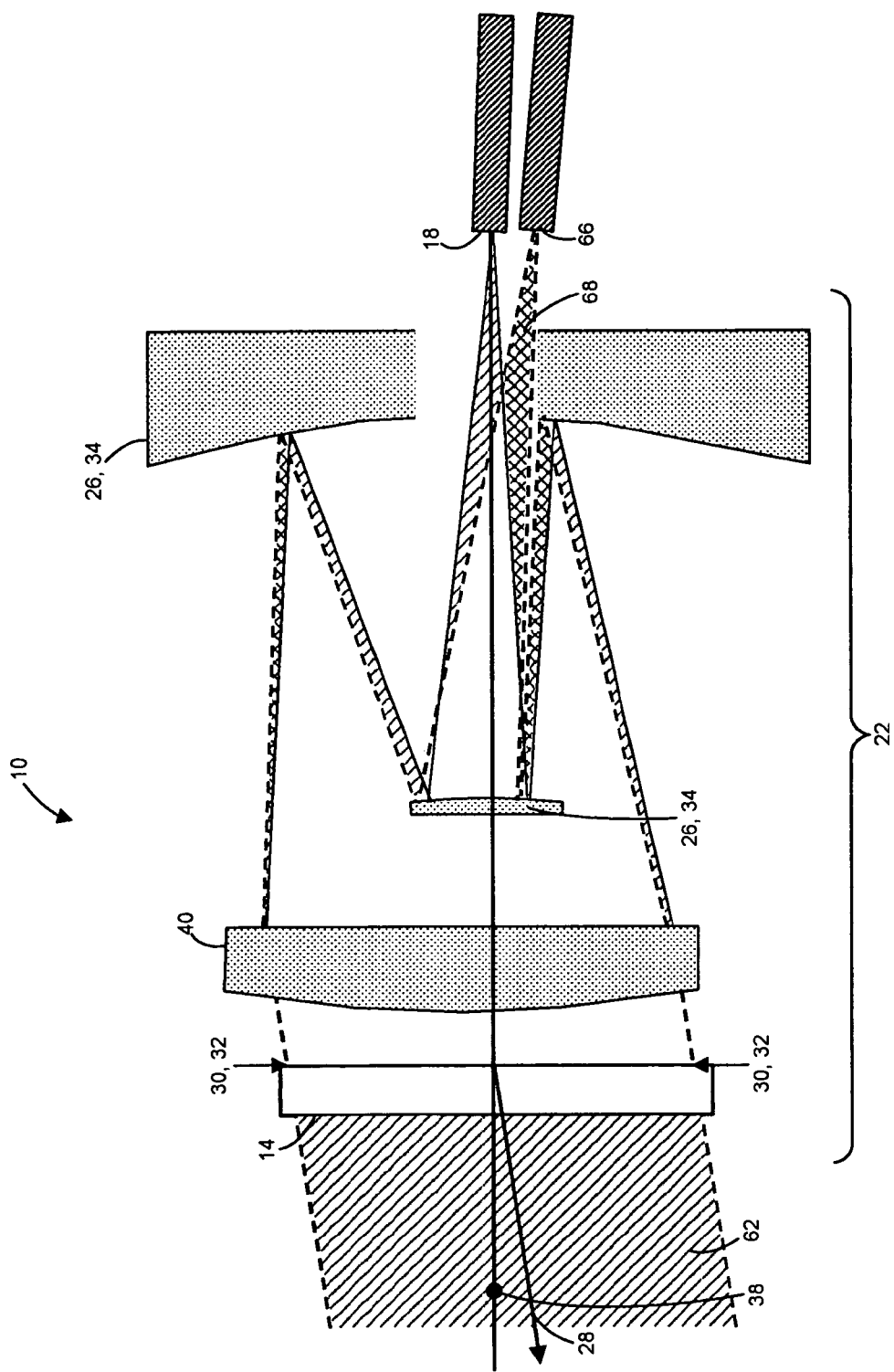
FIG. 10 is a side view of the target illuminating system wherein the combined optical beam is projected utilizing the collimating element including two mirrors and a lens.
Figure 11:
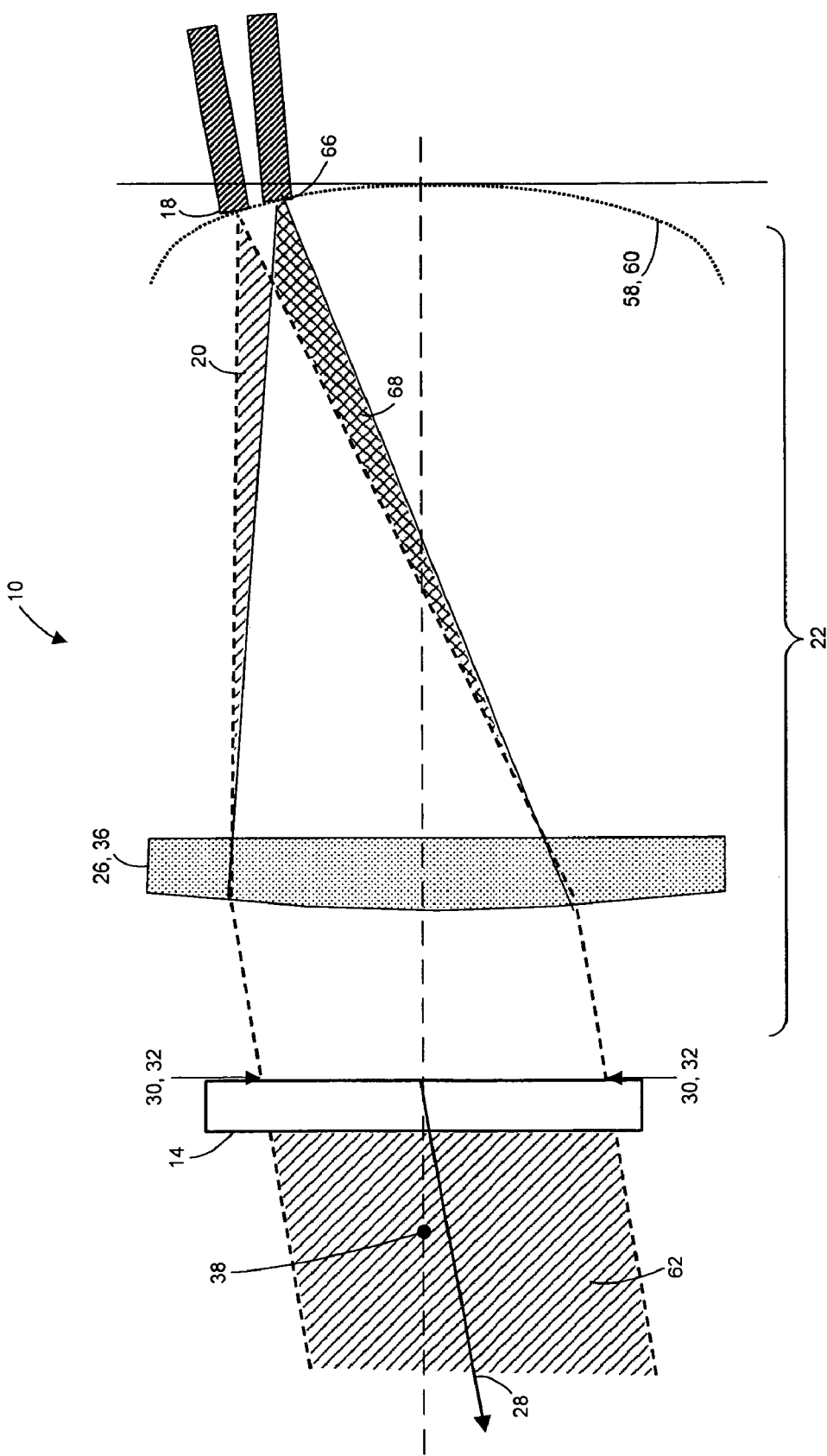
FIG. 11 is a side view of the target illuminating system wherein the scan beam outlets and the trail beam outlets are oriented orthogonally relative to a concave dish surface.

As shown in FIG. 2, it is contemplated that the scan beam radiation and trail beam radiation may be projected from any of the respective ones of the scan beam outlets 18 and the trail beam outlets 66, received and collimated as the combined optical beam 62 by the collimating element 26, and pass through the optical output aperture 14 with the combined exit pupil 70 being substantially coincident therewith. In this regard, each combined optical beam 62 emitted from the target illuminating system 10 at various desired coarse directions 28 may pass through the common combined exit pupil 70 which is substantially coincident with the optical output aperture 14. In an implementation, the collimating element 26 may output the combined optical beam 62 with the combined exit pupil 70 being substantially coincident with the focal point 38 of the collimating element 26, as shown in FIGS. 8–9. In another implementation, the output aperture 14 may be interposed between the focal point 38 of the collimating element 26 and the collimating element 26, as shown in FIGS. 10 and 11.

The target illuminating system 10 may steer the combined optical beam 62 in the desired coarse direction 28 corresponding to selected ones of the scan beam outlets 18 and trail beam outlets 66, as illustrated in FIGS. 2 and 8–9. In this regard, it is contemplated that the scan beam outlets 18 and the trail beam outlets 66 may be configured in the combined array 64. As a given one of the scan beam outlets 18 and a given one of the trail beam outlets 66 projects the respective ones of the point source of scan beam radiation 20 and the point source of trail beam radiation 68 to the collimating element 26, the collimating element 26 may output the collimated scan optical beam 12 in the given coarse direction 28. Similarly, when another given one of the scan beam outlets 18 and another given one of the trail beam outlets 66 projects the respective ones of the point source of scan beam radiation 20 and the point source of trail beam radiation 68 to the collimating element 26, the collimating element 26 may output the collimated scan optical beam 12 in another given coarse direction 28.

It is contemplated that the combined array 64 of the scan beam outlets 18 and the trail beam outlets 66 may be configured to utilize a maximum number of the scan beam outlets 18 and the trail beam outlets 66. The maximum number of the scan beam outlets 18 and the trail beam outlets 66 may be indicated by the proximity of the scan beam outlets 18 and the trail beam outlets 66 to each other within the combined array 64. It is contemplated that the maximum number of the scan beam outlets 18 and the trail beam outlets 66 may be a configuration wherein the scan beam outlets 18 and the trail beam outlets 66 are positioned adjacent relative to one another with little or no space therebetween. However, it is also contemplated that the combined array 64 of the scan beam outlets 18 and the trail beam outlets 66 may be configured to utilize a minimal number of the scan beam outlets 18 and the trail beam outlets 66. In such a configuration, it is contemplated that the scan beam outlets 18 and the trail beam outlets 66 may be spaced distally relative to one another in the combined array 64. It is contemplated that the configuration of the combined array 64 of scan beam outlets 18 and the trail beam outlets 66 may be manipulated to alter the range of the coarse direction 28 through which the collimating element 26 may output the combined optical beam 62.

The collimating element 26 may be at least one mirror. It is contemplated that the collimating element 26 may include a mirror and lens combination as well, as shown in FIG. 10. According to an embodiment of the present invention, the combined optical beam 62 outputted by the mirror 34 may have the combined exit pupil 70 being substantially coincident with the optical output aperture 14. However, as shown in FIG. 10, the output aperture 14 may be interposed between the focal point 38 of the collimating element 26 and the collimating element 26.

Additionally, the collimating element 26 may be at least one lens. This embodiment of the present invention, as shown in FIG. 2, also may provide that the combined exit pupil 70 be substantially coincident with the optical output aperture 14 for each combined optical beam 62 emitted from the target illuminating system 10.

As illustrated in FIG. 8, it is further contemplated that the lens 36 utilizes a transverse chromatic aberration 72 to combine the scan optical beam 12 and the trail optical beam. In this regard, the scan beam outlets 18 and the trail beam outlets 66 may be configured in the combined array 64 to utilize the transverse chromatic aberration 72. Additionally, as shown in FIG. 9, it is also contemplated that the lens 36 utilizes a longitudinal chromatic aberration 74 to combine the scan optical beam 12 and the trail optical beam. In this regard, the scan beam outlets 18 and the trail beam outlets 66 may be configured in the combined array 64 to utilize the longitudinal chromatic aberration 74.

In another embodiment of the present invention, it is contemplated that the collimating element 26 may define a focal point 38 along the optical path 22, as illustrated in FIGS. 8–10. The collimating element 26 may thereby output the combined optical beam 62 with the combined exit pupil 70 being substantially coincident with the focal point 38 of the collimating element 26 and the optical output aperture 14. In this regard, the collimating element 26 may be at least one lens. Therefore, it is contemplated that multiple lenses may be used. The collimating element 26 may be configured to include a doublet, triplet or quadruplet lens. Furthermore, it is contemplated that other numbers and shapes of lenses may be used. The lenses may be concave, convex, or any configuration of concave and convex used together or separately.

Referring now again to FIG. 2, in another embodiment of the present invention, the target illuminating system 10 may further include a fine steering element 40. The fine steering element 40 may be disposed along the optical path 22 and may be operative to receive and redirect the combined optical beam 62 through a desired fine angular deviation 42. In this regard, it is contemplated that the fine steering element 40 follows the collimating element 26 along the optical path 22.

In another embodiment of the present invention, the fine steering element 40 may: be disposed along the optical path 22 intermediate the collimating element 26 and the focal point 38 and may be operative to receive and redirect the combined optical beam 62 through a desired fine angular deviation 42. In this regard, it is contemplated that the fine steering element 40 follows the collimating element 26 along the optical path 22. The fine steering element 40 may be one element, or it may refer to multiple fine steering elements that are utilized to receive and redirect the scan optical beam 12 through the desired fine angular deviation 42.

The fine steering element 40 may be one of several types of fine steering elements, such as a fast steering mirror, Risley prism pair, liquid crystal phased array, electro optic phased array, MEMS mirror 34 array, or a deformable mirror. It is contemplated that the fine steering element 40 may be any one of the aforementioned types of fine steering elements. However, it is also contemplated that any of the aforementioned fine steering elements may be used in combination in order to receive and redirect the combined optical beam 62 through the desired fine angular deviation 42.

As shown in FIG. 2, according to another aspect of the present invention, it is contemplated that the coarse direction 28 of the scan optical beam 12 may be adjusted in accordance to the desired fine angular deviation 42 in order to provide beam steering over smaller steering angles. Thus, according to an aspect of the present invention, the target illuminating system 10 may integrate the capabilities of steering the scan optical beam 12 through a coarse angle and the fine angular deviation 42.

According to another aspect of the present invention, the target illuminating system 10 may include a scan optical switch 44 including a plurality of scan optical ports 46, as shown in FIG. 2. The scan optical switch 44 may be operative to receive the scan beam radiation from the first radiation source 24 and selectively direct the scan beam radiation to at least one of the scan optical ports 46 in response to the desired coarse direction 28. Furthermore, the target illuminating system 10 may include a plurality of scan optical channels 48. Each scan optical channel 48 may include a scan beam inlet 50 and the scan beam outlet 18 and may be operative to transmit the scan beam radiation. In this regard, the scan beam inlets 50 may each be in optical communication with the respective ones of the scan optical ports 46 of the scan optical switch 44. The scan beam inlets 50 may be operative to receive and transmit the scan beam radiation to the respective ones of the scan beam outlets 18.

According to another aspect of the present invention, the target illuminating system 10 may include a trail optical switch 44 including a plurality of trail optical ports 78. The trail optical switch 44 may be operative to receive the trail beam radiation from the second radiation source 80 and selectively direct the trail beam radiation to at least one of the trail optical ports 78 in response to the desired coarse direction 28. Furthermore, the target illuminating system 10 may include a plurality of trail optical channels 82. Each trail optical channel 82 may include a trail beam inlet 84 and the trail beam outlet 66 and may be operative to transmit the trail beam radiation. In this regard, the trail beam inlet 84s may each be in optical communication with the respective ones of the trail optical ports 78 of the trail optical switch 44. The trail beam inlet 84s may be operative to receive and transmit the trail beam radiation to the respective ones of the trail beam outlets 66.

It is contemplated that the scan beam optical channels and the trail beam optical channels may be optical fibers. In this regard, the optical fibers utilized for the scan beam optical channels and the trail beam optical channels may be single mode or multi mode optical fibers. It is contemplated therefore that with the use of single mode optical fibers, the target illuminating system 10 may operate with the scan beam radiation and the trail beam radiation being hundreds of nanometers in bandwidth. Additionally, it is contemplated that the target illuminating system 10 may operate with the scan beam radiation and the trail beam radiation being thousands of nanometers in bandwidth when multi mode optical fibers are utilized. It is also contemplated that the scan beam radiation and the trail beam radiation be of distinct bandwidths.

In accordance with another aspect of the present invention, it is contemplated that the scan optical beam 12 may have the first wavelength and that the trail optical beam have a second wavelength. The first wavelength and the second wavelength may be determined according to the needs and specifications of the target illuminating system 10.

In accordance with yet another aspect of the present invention, each of the scan beam outlets 18 and the trail beam outlets 66 may be coplanar and telecentric, as depicted in FIG. 2. In this regard, the scan beam outlets 18 and the trail beam outlets 66 may be configured in a 2D coplanar combined array 88. The telecentricity of the scan beam outlets 18 and the trail beam outlets 66 may refer to their orthogonal orientation within the 2D coplanar combined array 88 relative to a common combined plane 90. In accordance with yet another aspect of the present invention, each of the scan beam outlets 18 and each of the trail beam outlets 66 may be coplanar and nontelecentric, as shown in FIG. 11. Therefore, the scan beam outlets 18 and the trail beam outlets 66 may be oriented in the 2D coplanar combined array 88; however the scan beam outlets 18 and the trail beam outlets 66 may not be oriented orthogonally relative to the common combined plane 90. In this regard, it is contemplated that the scan beam outlets 18 and the trail beam outlets 66 may each point inwardly toward the collimating element 26. It is contemplated that such a configuration may allow for compaction of the dimensions of the target illuminating system 10. Such compaction and miniaturization of the target illuminating system 10 may be desirable according to the requirements of certain applications.

In accordance with another aspect of the present invention, the target illuminating system 10 may include a fiber base dish 58 whereon each of the scan beam outlets 18 and each of the trail beam outlets 66 may be mounted, as shown in FIG. 2. Referring now to FIG. 11, in accordance with another aspect of the present invention, the fiber base dish 58 may define a concave dish surface 60 whereto each of the scan beam outlets 18 and each of the trail beam outlets 66 points inwardly toward the collimating element 26. The inwardly pointing orientation may be accomplished by orienting each of the scan beam outlets 18 and trail beam outlets 66 relatively perpendicular with respect to the concave dish surface 60; however, such perpendicular orientation is not required. Thus, the fiber base dish 58 may define the concave dish surface 60 and the scan beam outlets 18 and trail beam outlets 66 need not be oriented orthogonally relative to the concave dish surface 60. Such an inwardly pointing orientation may provide for a configuration of the scan beam outlets 18 and the trail beam outlets 66 that is not coplanar nor telecentric. Thus, each of the scan beam outlets 18 and the trail beam outlets 66 may be mounted on the fiber base dish 58 and may each point inwardly toward the collimating element 26.

In another embodiment of the present invention, the scan beam outlets 18 and the trail beam outlets 66 may be spaced within the combined array 64 at a transverse distance 92 in order to compensate for the transverse chromatic aberration 72 of the lens, as shown in FIG. 8. The transverse distance 92 may be equal to the transverse chromatic aberration 72 of the lens 36. In an additional embodiment of the present invention, the scan beam outlets 18 and the trail beam outlets 66 may be spaced within the combined array 64 at a longitudinal distance 94 in order to compensate for the longitudinal chromatic aberration 74 of the lens 36, as shown in FIG. 9. It is contemplated that the configurations required for the transverse chromatic aberration 72 and the longitudinal chromatic aberration 74 may be manipulated depending on the requirements of a given application.

This description of the various embodiments of the present invention is presented to illustrate the preferred embodiments of the present invention, and other inventive concepts may be otherwise variously embodied and employed. The appended claims are intended to be construed to include such variations except insofar as limited by the prior art.

What is claimed is:

1. A target illuminating system for reducing the size of an optical output aperture, the system comprising:
    a. a plurality of scan beam outlets, each scan beam outlet being selectively operative to receive a scan beam radiation and project the scan beam radiation at a different angle compared to the projection of the scan beam radiation of the other scan beam outlets; and
    b. a collimating element being disposed adjacent the plurality of scan beam outlets and sized and configured to receive the plurality of scan beam radiations from the scan beam outlets and to redirect the plurality of collimated scan beam radiations through a common point;

c. wherein the optical output aperture and the common point are aligned to each other for reducing the size of the optical output aperture.

2. The target illuminating system of claim 1 wherein the collimating element is at least one mirror.

3. The target illuminating system of claim 1 wherein the collimating element is at least one lens.

4. The target illuminating system of claim 1 wherein the collimating element defines a focal point along the optical path, the collimating element outputting the scan optical beam with the exit pupil being substantially coincident with the focal point of the collimating element.

5. The target illuminating system of claim 4 wherein the collimating element is at least one lens.

6. A target illuminating system for steering a scan optical beam and reducing the size of an optical output aperture, the system comprising:
   a. an array of scan beam outlets being selectively operative to receive and project a point source of scan beam radiation along an optical path;
   b. a collimating element being disposed along the optical path, the collimating element being operative to receive the point source of scan beam radiation and to output the collimated scan optical beam in a desired coarse direction corresponding to a selected one of the scan beam outlets, the scan optical beam defining a scan exit pupil, wherein the scan exit pupil is substantially coincident with the optical output aperture; and
   c. a fine steering element disposed along the optical path and being operative to receive and redirect the scan optical beam through a desired fine angular deviation.

7. The target illuminating system of claim 1 wherein each of the scan beam outlets are coplanar and telecentric.

8. The target illuminating system of claim 1 wherein each of the scan beam outlets are coplanar and non-telecentric.

9. The target illuminating system of claim 8 wherein each of the scan beam outlets points inwardly toward the collimating element.

10. The target illuminating system of claim 7 or 8 further including a fiber base dish whereon each of the scan beam outlets is mounted.

11. The target illuminating system of claim 1 further including:
   a. a scan optical switch including a plurality of scan optical ports and being operative to receive the scan beam radiation from a first radiation source and selectively direct the scan beam radiation to at least one of the scan optical ports in response to the desired coarse direction; and
   b. a plurality of scan optical channels each including a scan beam inlet and the scan beam outlet and being operative to transmit the scan beam radiation, the scan beam inlets each being in optical communication with the respective ones of the scan optical ports and being operative to receive and transmit the scan beam radiation to the respective ones of the scan beam outlets.

12. The target illuminating system of claim 11 wherein each of the scan optical channels are optic fibers.

13. The target illuminating system of claim 1 further including a fine steering element being disposed along the optical path and being operative to receive and redirect the scan optical beam through a desired fine angular deviation.

14. The target illuminating system of claim 1 wherein the scan optical beam has a first wavelength.

15. A target illuminating system for steering a scan optical beam and reducing the size of an optical output aperture, the system comprising:
   a. an array of scan beam outlets being selectively operative to receive and project a point source of scan beam radiation along an optical path;
   b. a collimating element being disposed along the optical path, the collimating element being operative to receive the point source of scan beam radiation and to output the collimated scan optical beam in a desired coarse direction corresponding to a selected one of the scan beam outlets, the scan optical beam defining a scan exit pupil, wherein the scan exit pupil is substantially coincident with the optical output aperture; and
   c. a fiber base dish defining a concave dish surface whereto each of the scan beam outlets is oriented relatively orthogonally and points inwardly toward the collimating element.

16. A target illuminating system for steering a combined optical beam and reducing the size of an optical output aperture, the system comprising:
   a. a plurality of scan beam outlets and trail beam outlets, each scan beam outlet being selectively operative to receive and project scan beam radiation at a different angle compared to the projection of scan beam radiation of the other scan beam outlets, each trail beam outlet being selectively operative to receive and project trail beam radiation at a different angle compared to the projection of trail beam radiation of the other trail beam outlets; and
   a collimating element being disposed adjacent the plurality of scan and trail beam outlets and sized and configured to receive the plurality of scan and trail beam radiations and to output the collimated combined optical beam through a common point.

17. The target illuminating system of claim 16 wherein the collimating element is at least one lens.

18. The target illuminating system of claim 17 wherein the lens utilizes a longitudinal chromatic aberration to combine the scan optical beam and the trail optical beam.

19. The target illuminating system of claim 17 wherein the lens utilizes a transverse chromatic aberration to combine the scan optical beam and the trail optical beam.

20. The target illuminating system of claim 16 wherein the collimating element defines a focal point along the optical path, the collimating element outputting the collimated combined optical beam with the combined exit pupil being substantially coincident with the focal point of the collimating element.

21. The target illuminating system of claim 20 further including a fine steering element being disposed along the optical path intermediate the collimating element and the focal point and being operative to receive and redirect the combined optical beam through a desired fine angular deviation.

22. The target illuminating system of claim 20 wherein the collimating element is at least one lens.

23. The target illuminating system of claim 16 wherein each of the scan beam outlets and the trail beam outlets are coplanar and telecentric.

24. The target illuminating system of claim 16 wherein each of the scan beam outlets and the trail beam outlets are coplanar and non-telecentric.

25. The target illuminating system of claim 23 or 24 further including a fiber base dish whereon each of the scan beam outlets and the trail beam outlets is mounted.

26. The target illuminating system of claim 24 wherein each of the scan beam outlets and the trail beam outlets points inwardly toward the collimating element.

27. The target illuminating system of claim 16 further including:
- a. a scan beam optical switch including a plurality of scan beam optical ports and being operative to receive the scan beam radiation from a first radiation source and selectively direct the scan beam radiation to at least one of the scan beam optical ports in response to the desired coarse direction;
- b. a plurality of scan beam optical channels each including a scan beam inlet and the scan beam outlet and being operative to transmit the scan beam radiation, the scan beam inlets each being in optical communication with the respective ones of the scan optical ports and being operative to receive and transmit the scan beam radiation to the respective ones of the scan beam outlets;
- c. a trail beam optical switch including a plurality of trail beam optical ports and being operative to receive the trail beam radiation from a second radiation source and selectively direct the trail beam radiation to at least one of the trail beam optical ports in response to the desired coarse direction; and
- d. a plurality of trail beam optical channels each including a trail beam inlet and the trail beam outlet and being operative to transmit the trail beam radiation, the trail beam inlets each being in optical communication with the respective ones of the trail beam optical ports and being operative to receive and transmit the trail beam radiation to the respective ones of the trail beam outlets.

28. The target illuminating system of claim 27 wherein each of the scan beam optical channels and the trail beam optical channels are optic fibers.

29. The target illuminating system of claim 16 wherein the collimating element is at least one mirror.

30. The target illuminating system of claim 16 wherein the scan beam radiation has a first wavelength and the trail beam radiation has a second wavelength.

31. The target illuminating system of claim 16 further including a fiber base dish defining a concave dish surface whereto each of the scan beam outlets and the trail beam outlets is oriented relatively orthogonally and points inwardly toward the collimating element.

32. A target illuminating system for steering a combined optical beam and reducing the size of an optical output aperture, the system comprising:

- a. an array of scan beam outlets and trail beam outlets being selectively operative to receive and project the respective ones of a point source of scan beam radiation and a point source of trail beam radiation along an optical path;
- b. a collimating element being disposed along the optical path, the collimating element being operative to receive the point sources of scan and trail beam radiation and to output the collimated combined optical beam in a desired coarse direction corresponding to selected ones of the scan and trail beam outlets, the combined optical beam defining a combined exit pupil, wherein the combined exit pupil is substantially coincident with the optical output aperture; and
- c. a fine steering element being disposed along the optical path and being operative to receive and direct the combined optical beam through a desired fine angular deviation.

33. A target illuminating system for tracking a target within a field of regard as the target illuminating system travels past the target, the system comprising:

- a. a plurality of scan beam outlets, each scan beam outlet being selectively operative to receive a scan beam radiation and project the scan beam radiation at a different angle compared to the projection of the scan beam radiation of the other scan beam outlets; and
- b. a fixed collimating element being disposed adjacent the plurality of scan beam outlets and sized and configured to receive the plurality of scan beam radiations from the scan beam outlets and to redirect the plurality of collimated scan beam radiations in the field of regard;
- c. wherein the scan beam radiation projected through the plurality of scan beam outlet and redirected through the fixed collimating element covers a different area within the field of regard such that as the target illuminating system travels past the target, a different scan beam outlet projects the scan beam radiation to maintain contact with the target.

* * * * *